United States Patent [19]

Kato et al.

[11] 4,368,384
[45] Jan. 11, 1983

[54] GAIN SETTING DEVICE FOR RADIATION IMAGE READ OUT SYSTEM

[75] Inventors: Hisatoyo Kato; Masamitsu Ishida, both of Minami-ashigara, Japan

[73] Assignee: Fuji Photo Film Co. Ltd., Kanagawa, Japan

[21] Appl. No.: 168,798

[22] Filed: Jul. 11, 1980

[30] Foreign Application Priority Data

Jul. 11, 1979 [JP] Japan .................................. 54-87804
Jun. 4, 1980 [JP] Japan .................................. 55-75317

[51] Int. Cl.³ ........................ H05B 33/00; G01J 1/32; G01T 1/00
[52] U.S. Cl. ................................ 250/484.1; 250/205; 250/354.1
[58] Field of Search ..................... 250/205, 337, 327.1, 250/354, 483, 484

[56] References Cited

U.S. PATENT DOCUMENTS

| | | |
|---|---|---|
| 3,171,032 | 2/1965 | Holt ..................................... 250/205 |
| 3,487,209 | 12/1969 | Perry ................................... 250/337 |
| 3,670,202 | 6/1972 | Paine et al. .......................... 250/205 |
| 3,859,527 | 1/1975 | Luckey ................................ 250/337 |
| 4,258,264 | 3/1981 | Kotera et al. ....................... 250/484 |

*Primary Examiner*—Alfred E. Smith
*Assistant Examiner*—Janice A. Howell
*Attorney, Agent, or Firm*—Gerald J. Ferguson, Jr.; Joseph J. Baker

[57] ABSTRACT

In a radiation image recording system in which a stimulable phosphor plate is exposed to an imagewise radiation to store the energy of the radiation and record a latent image of a radiation image, the stimulable phosphor plate is then exposed to stimulating rays to emit light according to the stored energy of radiation, and the emitted light is detected to obtain an image signal, a radiation image read out device is provided with a gain setting device for selecting or presetting the gain of the read out system to obtain a final radiation image of desirable density and contrast. The gain setting device includes a means for taking out a part of the stimulating rays and introducing the taken out part of the stimulating rays into a photodetector. The output of the photodetector is compared with a standard signal level and the gain of the read out system is controlled to make the output equal to the standard signal level.

6 Claims, 3 Drawing Figures

GAIN SETTING DEVICE FOR RADIATION IMAGE READ OUT SYSTEM

BACKGROUND OF THE INVENTION

1. Field of the Invention

This invention relates to a radiation image information read out device for stimulating a stimulable phosphor carrying a latent image of a radiation image in the form of stored energy of radiation and causing the phosphor to emit light according to the stored energy, and more particularly to a device for controlling the gain of a radiation image information read out device.

2. Description of the Prior Art

When a stimulable phosphor is exposed to a radiation like X-rays, $\alpha$-rays, $\beta$-rays, $\gamma$-rays and ultraviolet rays, a part of the energy of the radiation is stored in the phosphor. Then, when the stimulable phosphor is subjected to exposure to stimulating rays, the phosphor emits light according to the amount of energy stored therein.

A radiation image recording system using the stimulable phosphor in which a radiation image of a human body or the like is first recorded in a stimulable phosphor in the form of a pattern of energy of radiation, the stimulable phosphor carrying the radiation latent image is exposed to a laser beam or other stimulating rays to emit light according to the stored energy, the emitted light is detected by photodetectors and the detected information is converted to an image signal and used for modulating a recording light beam to record a radiation image on a photosensitive material like a photographic film is proposed as disclosed in U.S. Pat. No. 3,859,527.

In the above described radiation image recording system, there is a problem in the step of reading out the recorded radiation image information that the intensity of the light emitted from the stimulable phosphor greatly changes even if the intensity of the stimulating laser beam is maintained constant because the image recording conditions such as the dose of the radiation used for recording the image in the phosphor, the spectrum of the radiation energy and the kind of the object are not always the same. Accordingly, the radiation image finally obtained does not have stable quality. In other words, the contrast or density of the finally obtained image changes for every image according to the difference in the image recording conditions. Therefore, in case of fixing the gain of the image read out device, even if the gain of the image read out device is proper for one radiation image, it may be improper for another radiation image because the gain is too small to provide a properly high signal-to-noise ratio.

Further, the output of the laser source for emitting a laser beam as the stimulating rays is unstable and fluctuates or decays by 10 to 20% during its operation. Since the intensity of the light emitted from the stimulable phosphor is nearly in proportion to the intensity of the stimulating rays, the fluctuation or the decay of the output of the laser source provides a serious problem in obtaining a radiation image of high quality and desirable contrast and density.

Therefore, there is a demand for a radiation image information read out device in which the gain of the read out system is controllable according to the image recording condition and the level of the power of the stimulating ray source.

SUMMARY OF THE INVENTION

The primary object of the present invention is to provide a device for controlling the gain of a radiation image information read out device in accordance with the image recording condition and/or the level of the power of the stimulating ray source, whereby the level of the output image signal obtained thereby is maintained within a predetermined range.

A more specific object of the present invention is to provide a device for presetting the read out gain of a radiation image information read out device before the read out device starts to read out the radiation image information recorded in a stimulable phosphor plate based on the image recording condition for the image recorded therein and the level of the power of the stimulating ray source at the time of starting the image read out.

The above objects of the present invention are accomplished by providing a stimulating ray detecting portion at a part of the light detecting face of a photodetector for detecting the light emitted from the stimulable phosphor plate, means for transmitting at least a part of the stimulating rays to said stimulating ray receiving portion of the photodetector before the read out device starts to read out the radiation image information, means for comparing the level of the output signal of the photodetector with a level of a predetermined standard voltage, and means for controlling the read out gain of the read out system to make said levels equal to each other before the read out device starts to read out.

In a preferred embodiment of the present invention, the standard voltage is determined by use of a standard signal S. In another preferred embodiment of the present invention, the amount of the part of the stimulating rays taken out and transmitted to said photodetector is controlled by use of a standard signal S.

In accordance with the present invention, it is possible to compensate for the difference in the image recording conditions and also for the fluctuation or the decay in the power of the stimulating ray source and in the output gain of the photodetector used for detecting the light emitted from the stimulated phosphor. Further, owing to the compensation, it is possible to correct the mistake in the image recording operation at the time of initially recording a radiation image in the stimulable phosphor plate such as an erroneous selection of dose of the radiation. Furthermore, since the image recording condition can be changed without changing the quality, that is, density and/or contrast of the finally obtained radiation image, it is possible to freely select the dose of radiation according to the purpose of diagnosis in case of a radiation image of human body taken for the diagnostic purpose and accordingly the diagnostic efficiency and accuracy can be improved or unnecessary exposure of a human body to excessive dose of radiation can be prevented.

As the stimulable phosphor which is desired to emit light having a wavelength within the range of 300 to 500 nm, rare earth activated alkaline earth metal fluorohalide phosphor is preferred. One example of this phosphor is a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is a phosphor represented by the formula $(Ba_{1-x}, M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; BaO.xAl$_2$O$_3$:Eu wherein $0.8 \leq x \leq 10$; and M$^{II}$O.xSiO$_2$:A wherein M$^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in Japanese unexamined Patent Publication No. 55(1980)-12144. Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby.

As the stimulating rays for stimulating the stimulable phosphor to cause the phosphor to emit light is used a laser beam having high directivity. As the light source for the laser beam is preferred a laser source capable of emitting light having a wavelength within the range of 500 to 800 nm, preferably 600 to 700 nm. For example, a He-Ne laser (633 nm) and a Kr laser (647 nm) can be used. Other light sources can be used if combined with a filter which cuts out the light of the wavelength of less than 500 nm and more than 800 nm.

In the present invention, the standard signal S is made from a signal obtained by measuring the light emitted from the stimulable phosphor when the phosphor plate is exposed to radiation at the time of recording a radiation image by use of a photodetector or photodetectors or the like arranged behind the stimulable phosphor plate. The standard signal S thus obtained is used for setting the gain level of the image information read out system of the read out device. As the standard signal S can be used, for example, the maximum value Smax, the minimum value Smin, the average value $\overline{S}$, or logarithm of these values logSmax, logSmin, log$\overline{S}$ and the like. Further, when the difference logSmax−logSmin is smaller than a predetermined value, Smin may be used as the standard signal S. When the difference logSmax−logSmin is larger than a predetermined value on the other hand, the average value $\overline{S}$ may be used as the standard signal.

DESCRIPTION OF THE PREFERRED EMBODIMENTS

Now the present invention will be described in detail with reference to particular embodiments thereof referring to the accompanying drawing as briefly described above.

Figure 1:
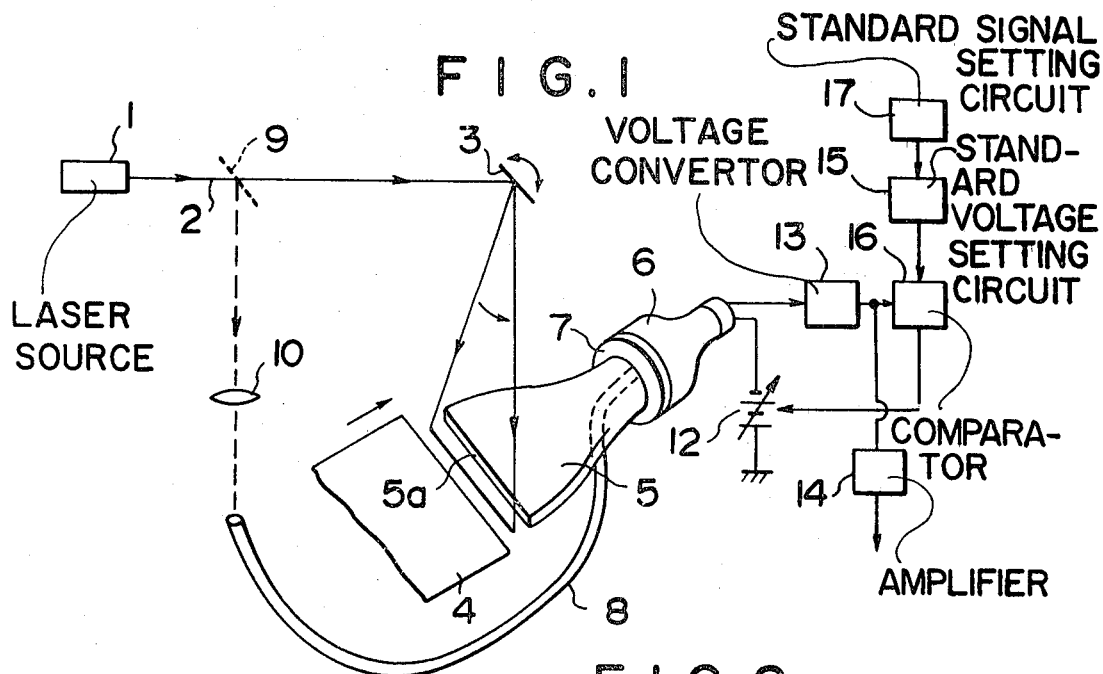
FIG. 1 is a schematic view showing an embodiment of the present invention.
Figure 2:
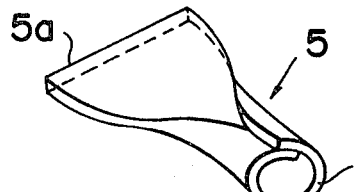
FIG. 2 is a perspective view of an example of a light guiding sheet employed in the present invention.

FIG. 1 shows a preferred embodiment of the present invention. Referring to FIG. 1, a laser source 1 emits a laser beam 2 having a wavelength within the range of 500 to 800 nm. The laser beam 2 is deflected one dimensionally by a light deflector 3 like a galvanometer mirror to perpendicularly impinge upon and scan a stimulable phosphor plate 4 which carries a latent radiation image in the form of stored energy of radiation. A light guiding sheet 5 is provided close to the stimulable phosphor plate 4 with the light detecting face 5a thereof located along the primary scanning line on the stimulable phosphor plate 4. At an end remote from the light detecting face 5a the light guiding sheet 5 has a light output face 5b having an annular or ring-shaped shape to be accommodated with the light detecting face of the photodetector 6 like a photomultiplier. The light output face 5b (FIG. 2) is connected in contact with the light detecting face of the photodetector 6. The light guiding sheet 5 is made of transparent thermoplastic resin like acrylic resin and has a shape as shown in FIG. 2 so that the light emitted from the stimulable phosphor plate 4 is transmitted therethrough from the light detecting face 5a to the light output face 5b.

As the photodetector 6 is used, for example, a photomultiplier having a spectroscopic sensitivity of S-11 type. On the light detecting face of the photodetector 6 is attached a filter 7 which has a transmittance of 80% for the emitted light of the wavelength of 400 nm and 0.1% or less for a laser beam (633 nm), whereby only the light having the wavelength within the range of 300 to 500 nm is detected by the photodetector 6.

A beam splitter such as a semi-transparent mirror 9 is provided on the way of the laser beam 2 to reflect a part of the laser beam 2 toward an optical fiber bundle 8 through a focusing lens 10. The optical fiber bundle 8 is connected at an end thereof with a part of the light receiving face of the photodetector 6. The filter 7 attached to the face of the photodetector 6 is provided with a hole through which the end of the optical fiber bundle 8 extends so that the light transmitting through the optical fiber bundle 8 reaches the photodetector 6.

The photodetector 6 is driven with a high voltage 12 which is controlled to vary the gain (output level) of the photodetector 6 like a photomultiplier.

The output of the photodetector 6 is converted to a voltage through a voltage conversion circuit 13 and then sent to an amplifier 14 to be amplified and sent to an image processing section not shown.

A standard voltage setting circuit 15 is connected with a comparator 16 which is connected with the voltage conversion circuit 13 so that the comparator 16 may compare the output of the voltage conversion circuit 13 with the standard voltage set by the standard voltage setting circuit 15. The standard voltage is set by a standard signal S which is set by a standard signal setting circuit 17 connected with the input of the standard voltage setting circuit 15. The comparator 16 compares said two voltages and controls the high voltage power source 12 of the photodetector 6 with its output.

In controlling the gain of the photodetector 6, a part of the laser beam 2 emitted from the laser source 1 is taken out by use of the semi-transparent mirror 9 located in the path of the laser beam 2 and guided to the optical fiber bundle 8 by the lens 10. The part of the laser beam taken out and guided to the optical fiber bundle 8 is transmitted to the light receiving face of the photodetector 6 through the hole of the filter 7 on the face thereof. Thus, the taken out part of the laser beam 2 is directly introduced to the photodetector 6 through the optical fiber bundle 8.

The output of the photodetector 6 is converted to a voltage by the voltage conversion circuit 13 and sent to the comparator 16, where it is compared with the standard voltage set by the standard signal S given by the standard voltage setting circuit 15. Then, the high voltage power source 12 is controlled so that the two voltages becomes equal to each other. In more detail, when the standard signal S is small, namely when the amount of light emitted from the stimulable phosphor plate 4 at the time the phosphor plate 4 was first exposed to the imagewise radiation is small, the standard voltage is set high and the high standard voltage is compared with the output voltage of the photodetector 6 from the voltage conversion circuit 13. Therefore, in such a case, the high voltage power source 12 is controlled at a high level and the gain of the photodetector 6 is set at a high level.

It should be understood that the setting of the gain of the image information read out system including the photodetector 6 as described above is conducted before the image information read out device starts read out of the radiation image information. In other words, after the gain setting is completed the stimulable phosphor plate 4 starts to be scanned by the laser beam 2 reflected by the deflector 3 and the read out of image information is started. Therefore, it is possible to replace the semi-transparent mirror 9 with an ordinary mirror and remove the mirror when the read out starts after the gain is set.

When the standard signal S is determined on basis of a plurality of values like Smin and $\overline{S}$, the standard voltage should be determined in different ways according to the kind of the selected value on which the standard signal S is determined.

After the read out gain of the radiation image information read out system is controlled or properly set, the stimulable phosphor plate 4 is brought to the read out station and the image information starts to be read out. After the semi-transparent mirror 9 is taken away of the path of the laser beam 2, the laser beam 2 is deflected one dimensionally across the stimulable phosphor plate 4 by the galvanometer mirror 3. As the stimulable phosphor 4 is moved in the direction perpendicular to the direction of deflection, the stimulable phosphor plate 4 is scanned two dimensionally. The light emitted from the stimulable phosphor plate 4 upon stimulation thereof by the laser beam 2 is introduced to the photodetector 6 through the light guiding sheet 5.

The emitted light introduced to the photodetector 6 is converted to a voltage by the voltage conversion circuit 13 and amplified by the amplifier 14 and then sent to the image processing portion not shown to be subjected to necessary image processing like gradation processing or the like.

Figure 3:
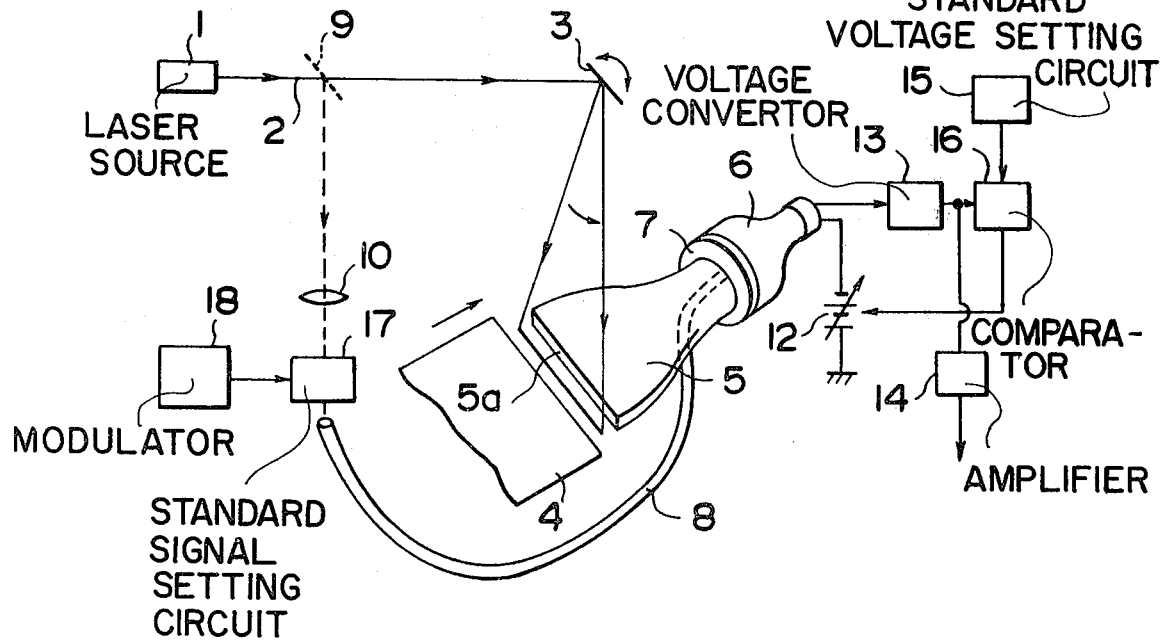
FIG. 3 is a schematic view showing another embodiment of the present invention.

Another preferred embodiment of the present invention will be described hereinbelow referring to FIG. 3. In the embodiment shown in FIG. 3, all the elements corresponding to those shown in FIG. 1 are designated with the same reference numerals and the detailed description thereof will be omitted here.

In this embodiment, a part of the laser beam 2 taken out by a semi-transparent mirror 9 is input into an acousto-optic modulator 18 through a lens 10. The modulator 18 is controlled by a standard signal S from a standard signal setting circuit 17 which is determined according to the condition of radiation image recording. Thus, a part of the laser beam 2 taken out of the laser beam from the laser source 1 is modulated according to the standard signal S. The laser beam thus controlled by the modulator 18 is guided into an optical fiber bundle 8 and transmitted to a photodetector 6.

The output signal from the photodetector 6 is sent to a voltage conversion circuit 13 and converted to a voltage to be compared with a standard voltage from a standard voltage setting circuit 15 at a comparator 16. Then, a high voltage power source 12 is controlled so that the two voltages becomes equal to each other. Thus, the read out gain of the photodetector 6 is set in advance of the image information read out.

This embodiment employs an optical means for converting the standard signal S to an amount of light beam, and accordingly the read out device becomes relatively complicated in structure. From this viewpoint, the former embodiment (FIG. 1) is more preferred.

The present invention is not limited to the above described two embodiments, but may be embodied in various other forms.

Though in the above embodiments only one light guiding sheet 5 is used, more than one light guiding sheet may be provided. For instance, a pair of light guiding sheets may be provided symmetrically on both sides of the primary scanning line on the stimulable phosphor plate 4. Further, when the substrate of the stimulable phosphor plate 4 is transparent, one light guiding sheet may be located under the stimulable phosphor plate 4 with another located above the phosphor plate 4. Of course a pair of sheets 5 may be provided above and another pair of sheets 5 may be provided under the stimulable phosphor plate 4.

As mentioned above, the beam splitter is not limited to the semi-transparent mirror 9 and may be an ordinary mirror to reflect the whole laser beam 2 toward the optical fiber bundle 8.

In place of the acousto-optic modulator 18 can be used a rotatable wedge having continuously changing density or a movable knife edge.

Further, in the above described embodiment the read out gain of the read out system is changed by changing the voltage of the power of the photodetector 6. However, it is possible to change the read out gain by changing the bleeder resistance of the photomultiplier used as the photodetector 6 or changing the gain of the amplifier 14.

In place of the galvanometer mirror 3 can be used a polygon mirror. As the photodetector 6 can be used any kind of photodetector other than the photomultiplier. Further, as the light guiding sheet 5, any other kind of light guiding means can be employed. The optical fiber bundle 8 can also be replaced by other kind of light guiding means.

We claim:

1. A read out gain setting device for a radiation image information read out device in which a stimulable phosphor plate is exposed to an imagewise radiation to store the energy of the radiation and record a latent image of a radiation image, the stimulable phosphor plate is exposed to stimulating rays to emit light having a wavelength different from the wavelength of the stimulating rays according to the stored energy radiation, and the emitted light is detected by an image information read out system including a photodetector, said read out gain setting device comprising a stimulating ray receiving portion provided on a part of the light receiving face of said photodetector, means for taking out at least a part of said stimulating rays and transmitting the taken out part of the stimulating rays to said stimulating ray receiving portion of said photodetector, means for comparing the output level of said photodetector with the level of a predetermined standard voltage, and means for controlling the read out gain of the image information read out system so as to make the output level of said photodetector equal to the level of said standard voltage.

2. A read out gain setting device as defined in claim 1 wherein said standard voltage is determined by a means for setting the standard voltage based on a standard signal which is used for setting the gain of the image information read out system.

3. A read out gain setting device as defined in claim 1 wherein said means for taking out at least a part of the stimulating rays and transmitting the same to said photodetector is provided with a light amount controlling means which controls the amount of the transmitted part of the stimulating rays with a standard signal used for setting the gain of the image information read out system.

4. A read out gain setting device as defined in claim 1, 2 or 3 wherein said photodetector is provided with a filter substantially opaque to the stimulating rays but passing the light emitted from the stimulable phosphor upon stimulation on the light receiving face thereof at a portion excluding said stimulating ray receiving portion.

5. A read out gain setting device as defined in claim 1, 2, or 3 wherein said photodetector is a photomultiplier and the gain of the image read out system is controlled by controlling the voltage of the power applied to the photomultiplier.

6. A read out gain setting device as defined in claim 1, 2, or 3 wherein the gain of the image read out system is controlled by controlling the gain of an amplifier for amplifying the output of the photodetector.

* * * * *